Feb. 16, 1937.                    C. DE L. RICE                    2,070,843
                            DYNAMO AND DRIVE THEREFOR
                              Filed Jan. 18, 1934                4 Sheets-Sheet 1
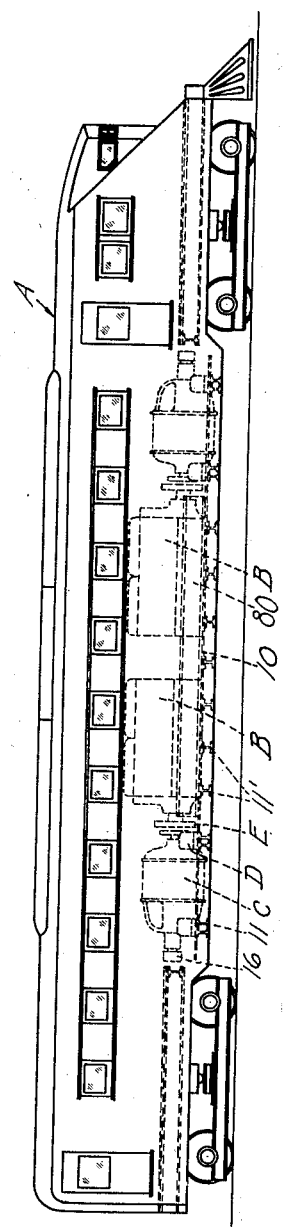
Inventor
*Charles De Los Rice*
By *W. Clay Lindsey.*
                              Attorney

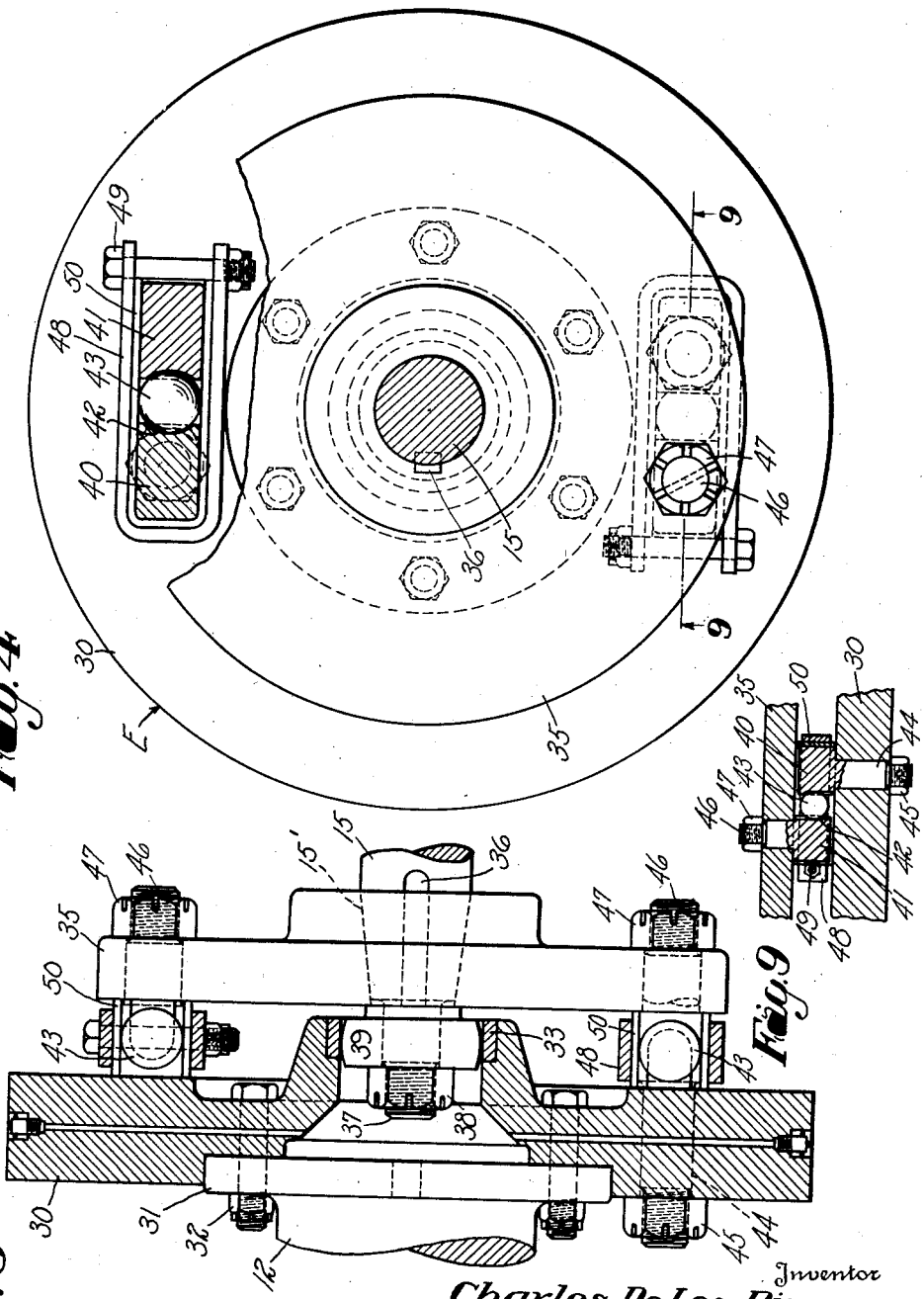

Feb. 16, 1937.  C. DE L. RICE  2,070,843
DYNAMO AND DRIVE THEREFOR
Filed Jan. 18, 1934    4 Sheets-Sheet 3
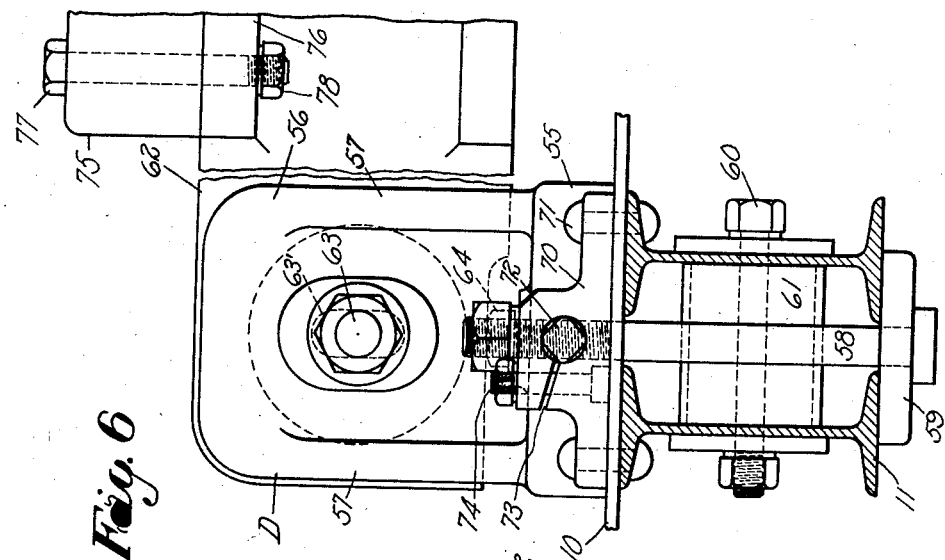
Inventor
*Charles DeLos Rice*
By *W. Clay Lindsey*
Attorney

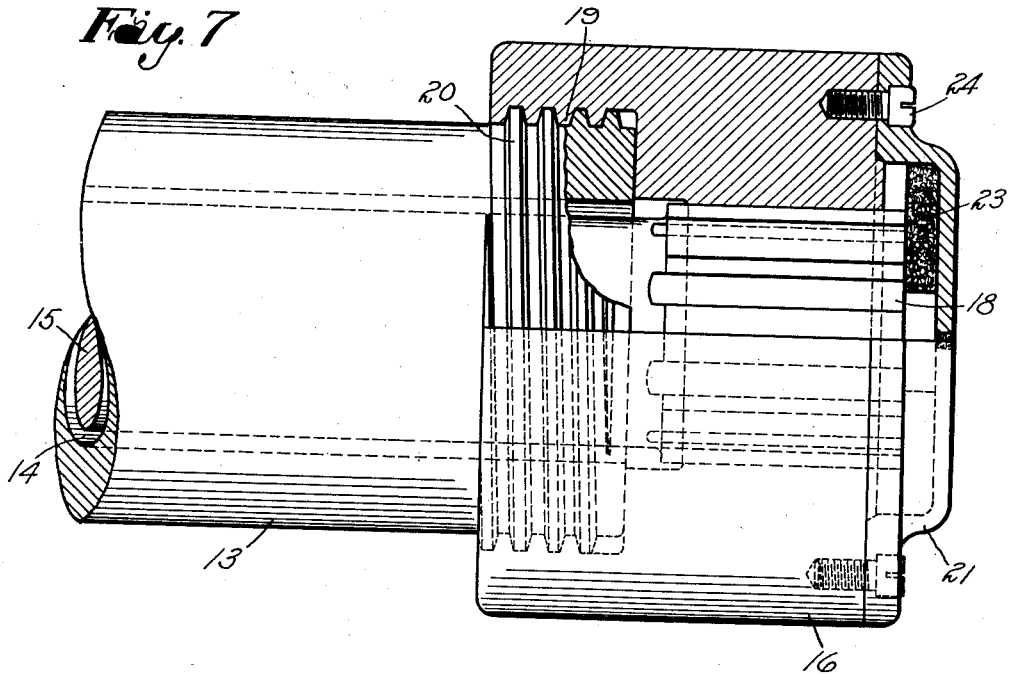
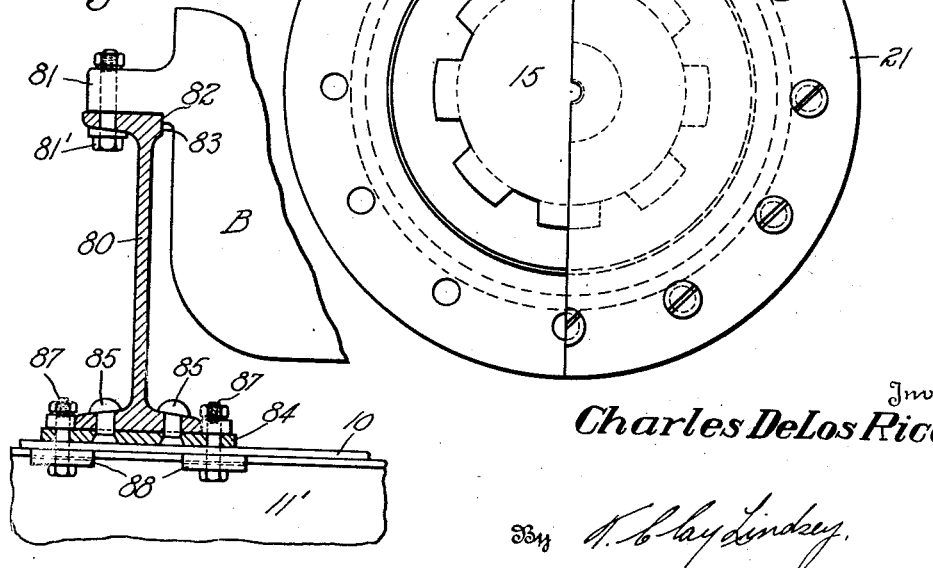

Patented Feb. 16, 1937

2,070,843

UNITED STATES PATENT OFFICE 2,070,843

DYNAMO AND DRIVE THEREFOR

Charles De Los Rice, West Hartford, Conn.

Application January 18, 1934, Serial No. 707,198

4 Claims. (Cl. 64—1)

The present invention relates generally to driving connections between a dynamo and drive therefor, and has particular reference to the driving connection between a drive unit such, for example, as a Diesel engine and a driven unit, such as an electric dynamo. As an instance of a use to which the present invention may be applied, reference may be had to a power plant for driving a railway car and train as in such instance the invention finds peculiar adaptability.

The aim of the present invention is to provide an improved driving connection between the drive unit and the dynamo which will permit of these units being placed closely together, thus effecting a saving in space and a saving in weight, factors which are very important in railway car construction, the arrangement being such as to permit of sufficient play or movement between the two units to avoid any cramping action and to reduce the transmission of vibrations from the drive unit to the driven unit.

A further aim of the invention is to provide an improved arrangement for supporting a dynamo and aligning it with a drive unit or Diesel engine.

In the accompanying drawings, wherein is shown, for illustrative purposes, one embodiment which the present invention may take, Fig. 1 is a side view of a railway car equipped with two power plants constructed in accordance with the present invention;

Fig. 2 is a side view of the electric dynamo and shows the drive and supports therefor;

Fig. 3 is a central sectional view through the flexible coupling between the drive shaft and the intermediate driven shaft;

Fig. 4 is a face view of the flexible connection, with parts in section;

Fig. 5 is a view of one of the adjustable brackets for supporting the electric motor, the motor being shown in part;

Fig. 6 is an end view of the bracket;

Fig. 7 is a view partly in section showing the coupling between the intermediate shaft and the armature shaft;

Fig. 8 is an end view of the coupling, one-half of the cap plate being broken away;

Fig. 9 is a detail view taken substantially on line 9—9 of Fig. 4; and

Fig. 10 is an end view of one of the I-beam supports for the Diesel engines.

Referring to the drawings in detail, I have shown, for illustrative purposes, in Fig. 1 a railway car A provided with two power plants in which the features of the present invention are incorporated. It is understood, of course, that this disclosure is by way of illustration only. Each of the power plants includes generally a drive unit B which is preferably in the form of a Diesel engine and an electric dynamo C. The dynamos are shown as being mounted upon a platform 10 of the car, the same having supporting cross beams 11 preferably arranged in pairs as illustrated. Cross beams 11' secured to the platform serve to aid in the support of drive units B. The car may be provided with the motors mounted on the axles which carry the wheels, and these motors are electrically connected up to the dynamos, the motors and connections not being illustrated as they form no part of the present invention. Each Diesel engine has a drive shaft 12, and each dynamo has an armature 13. The Deisel engines are shown more or less diagrammatically as they may be of any suitable construction and, in fact, the driving unit may be other than a Diesel engine. Each generator is supported by suitable brackets D.

Referring now to the improvements of the present invention, the armature shaft 13 is provided with a through bore 14 which accommodates a relatively long intermediate shaft 15 of smaller diameter than the bore and extending beyond each end of the armature shaft. The drive unit and the dynamo are placed closely together end to end with the drive shaft 12 and the armature shaft 13 aligned. One end of the intermediate shaft 15 is aligned with and closely adjacent the end of the drive shaft 12 and is connected thereto by means of a flexible coupling designated generally by the letter E. The opposite end of the intermediate shaft is connected to that end of the armature shaft which is remote from the drive shaft 12 by means of a coupling member 16 shown most clearly in Figs. 7 and 8.

The coupling member 16 is in the form of a collar having a bore provided with longitudinally extending grooves or splineways 17 adapted to receive ribs or splines 18 on the outer end of the intermediate shaft. The collar has at one end an enlarged counterbore provided with an internal female thread 19 adapted to cooperate with a male thread 20 formed on the outer end of the armature shaft. The threads run in such direction that during the normal operation of the generator, there is no tendency of the coupling member to become unscrewed from the armature shaft. The collar or coupling member is, of course, caused to rotate with the intermediate shaft due to the splines 18, but the intermediate shaft may have a slight longitudinal or axial play with respect to the collar. The outer end of the collar may be provided with a removable cap 21 which is recessed so as to form an oil reservoir which may be partly filled with absorbent material 23. Thus dirt is prevented from gaining access to the interengaging surfaces between the splines and splineways, and these surfaces are maintained in lubricated condition. The cap plate may be secured in place by screws 24.

Referring now to the Figures 3, 4, and 9, wherein the flexible coupling E between the drive shaft 12 and the intermediate shaft 15 is disclosed in detail, 30 designates the usual fly wheel somewhat modified to suit my improved coupling. The engine shaft has the usual integral flange 31 to which the fly wheel is secured by bolts 32. The fly wheel 30 has an axially disposed opening provided with an internal bearing ring 33. The numeral 35 designates a plate or round disk provided with a central tapered opening adapted to wedgedly receive a tapered portion 15' of the intermediate shaft. The plate 35 is fixed against rotation relative to the shaft 15 by means of a key 36. The end of the shaft 15 terminates in a threaded axial stud 37 on which is screwed a nut 38. Between the nut and the plate 35 is a partispherical bearing member 39 of a diameter similar to the internal diameter of the bearing ring 33. It will be seen, particularly from Fig. 3, that the spherical bearing member or ball 39 is adapted to rock in the bearing member 33. The plates or disks 30 and 35 are pivotally connected together by two compensating driving units positioned to opposite sides to the center of rotation of the coupling. These units are similar in construction and arrangement. Each has a pair of bearing blocks 40 and 41 respectively secured to the plates 30 and 35 and having their opposed faces provided with parti-cylindrical grooves 42. These grooves cooperate to form a cylindrical raceway for a ball 43. The block 40 is provided with a threaded stud 44 which extends through an opening in the plate 30. The stud is secured in place with the block 40 against the face of the disk 30 by means of a nut 45. The block 41 is likewise provided with a threaded stem 46 secured to the plate 35 by a nut 47. The blocks are tied together by a U-shaped strap 48 and a bolt 49, the latter passing through the ends of the arms of the strap at one end of the unit. If desired, a leather liner strip 50 may be interposed between the strap 48 and the blocks, in order to seal the grease in the raceways. The arrangement between the balls 43 and the bearing blocks 40 and 41 permit of an axial movement of the intermediate shaft 15. This is desirable to allow for the usual floating or drifting movement of the armature shaft.

The generator is supported by four adjustable brackets D which are similar in construction and arrangement. These brackets are symmetrically placed. Each bracket has a base 55 adapted to rest upon the platform 10 of the car immediately above a pair of I-beams 11. Each bracket also has a vertical standard 56 which may be reinforced by webs 57. Each bracket is secured in place by means of a pair of bolts 58 which extend downwardly between the I-beams. The platform is provided with elongated slots 58' for accommodating the bolts 58. Between the heads of the bolts and the bottoms of the I-beams are plates 59. The I-beams may be held against spreading at a point beneath the brackets by means of a bolt 60. Between the vertical webs of the I-beams and about the bolt is a sleeve 61 so that these webs cannot collapse towards each other. The casing of the generator has, at each side, a longitudinally extending bar 62 extending from bracket to bracket. Each of these bars has a flat face adapted to engage against a correspondingly flat face of a respective standard 56. The bars 62 are secured to these standards by bolts 63. The bolts extend through elongated slots 63' in the standards so as to permit of vertical adjustment of the casing with respect to the brackets. Associated with each bracket is a vertical adjusting screw 64 upon the head of which a respective bar 62 is adapted to rest.

For the purpose of transversely adjusting the brackets D, there is provided in front of each bracket, a block 70 which is preferably secured in place to the platform and I-beams by means of rivets 71. Each block has a threaded opening adapted to receive a set screw 72, the inner end of which is adapted to engage against the respective base of a bracket. The block is slotted into the threaded opening, as at 73, so as to permit the wall of the opening to be contracted tightly against the set screw. A bolt 74 is provided for the purpose of effecting such contraction.

The generators are rigidly secured to the longitudinally extending bars 62 by means of cooperating flanges or fins 75 and 76 on the generator casing and bars respectively and a plurality of bolts 77 extending through registering apertures in these flanges and provided with nuts 78.

The Diesel engines are supported by a pair of longitudinally extending I-beams 80 located to opposite sides of the engines. Referring to Fig. 10, it will be noted that the casing of the Diesel engine has a laterally extending rib or web 81 which rests upon the top of the I-beam 80. The casing has, below the rib, a vertically disposed shoulder 82. The adjacent flange of the I-beam is cut away so as to provide a shoulder 83 which abuts against the shoulder 82. By thus cutting away the flanges of the I-beams, true shoulders 83 are provided for the proper positioning of the casing. Also, with this arrangement, the flange 81 will overlie the outer flange of the I-beam, thus permitting the anchor bolts 81' to be applied from the outside of the I-beam. Each I-beam rests upon and is secured to a relatively wide foot plate 84. The I-beam may be secured to this foot plate by rivets 85. The foot plate rests upon the floor 10. The foot plate is securely clamped in place against the floor by bolts 87. Between the heads of these bolts and the car floor 10 are large steel washers 88 which serve to stiffen the thin car floor where the bolts are placed.

It will be seen from the foregoing description, taken in connection with the accompanying drawings, that after the Diesel engine has been secured in position and the generator C has been brought to approximate position and connected to the Diesel engine, the generator may be adjusted both vertically and horizontally in order to properly align the drive shaft 12, the intermediate shaft 15, and the armature shaft. To adjust the generator transversely, the clamping bolts 74 are loosened and then the set screws 72 are turned so as to move the brackets. After this adjustment is made, the clamping screws 74 are tightened up so as to securely lock the set screws in position. Then the bolts 58 are tightened so as to clamp the brackets in adjusted position. To adjust the generator vertically, the bolts 63 are loosened somewhat, and the screws 64 are adjusted. After this adjustment is made, the bolts 63 are again tightened up.

It will further be observed that, due to the fact that the intermediate shaft extends through the armature shaft, the driving unit and the generator may be placed closely together while at the same time a driving connection of sufficient length is provided to accommodate any slight deflection or displacement between the units on account of the flexibility of the platform of the car. Thus, there is a considerable saving of space—a very important factor, particularly in connection with railway cars. Also, there is great reduction in the weight of the power plant.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a drive unit having a shaft, an electric dynamo having an armature shaft aligned with said drive shaft and provided with a through bore, an intermediate shaft of smaller diameter than and extending through said bore, a flexible driving coupling between one end of said intermediate shaft and drive shaft, and a slidable driving connection between the other end of said intermediate shaft and armature shaft, said connection between said intermediate shaft and armature shaft permitting of slight longitudinal movement between said shafts during rotation.

2. In combination, a drive unit having a shaft, an electric dynamo having an armature shaft aligned with said drive shaft and provided with a through bore, an intermediate shaft of smaller diameter than and extending through said bore, a flexible driving coupling including a member rigidly secured to one end of said intermediate shaft and a member rigidly secured to the drive shaft, and a slidable driving connection between the other end of said intermediate shaft and armature shaft, said last mentioned connection including a collar splined on said intermediate shaft and permitting free slidable movement therein and having threaded engagement with said armature shaft.

3. In combination, a drive shaft and an aligned driven shaft; and a flexible coupling between said shafts comprising a plate secured to the drive shaft, a plate secured to the driven shaft, bearing blocks carried by one of said plates and disposed to opposite sides of the axis of rotation of said shafts, bearing blocks carried by the other plate and paired with said first blocks, each pair of blocks providing a cylindrical raceway parallel to the axes of said shafts, spherical members in the raceways, said plate connected to the drive shaft having an axial opening providing an internal bearing surface, means for slidingly coupling the driven shaft at its end remote from its plate end to a member to be driven, said means including a collar threadably locked in driving engagement with said member and splined to the driven shaft permitting free axial movement of the shaft therein, and a parti-spherical bearing member secured to said driven shaft and engaging said bearing surface and admitting compensating movements of the driven shaft between its coupling and the drive shaft.

4. In combination, a drive shaft and an aligned driven shaft; a flexible coupling between said shafts comprising a plate secured to the drive shaft, a plate secured to the driven shaft, bearing blocks carried by one of said plates and disposed to opposite sides of the axis of rotation of said shafts, bearing blocks carried by the other plate and paired with said first mentioned blocks, means for tying the blocks of each pair together, the opposed faces of each pair of blocks having grooves forming cylindrical raceways, and bearing balls in said raceways, means for coupling the driven shaft at its end remote from its plate end to a member to be driven, and a compensating bearing between the drive and driven shafts to admit compensating movements of the driven shaft between its coupling and the drive shaft.

CHARLES DE LOS RICE.